Sept. 4, 1962  G. H. SANSTROM  3,052,480
WHEELED CARRIER
Filed Oct. 28, 1959  4 Sheets-Sheet 1
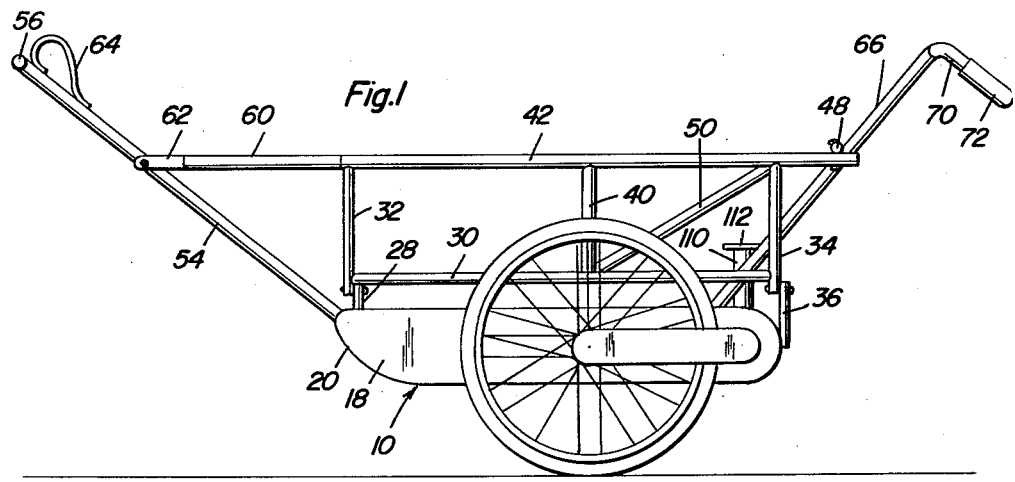
Grant H. Sanstrom
INVENTOR.

Sept. 4, 1962 G. H. SANSTROM 3,052,480
WHEELED CARRIER
Filed Oct. 28, 1959 4 Sheets-Sheet 2
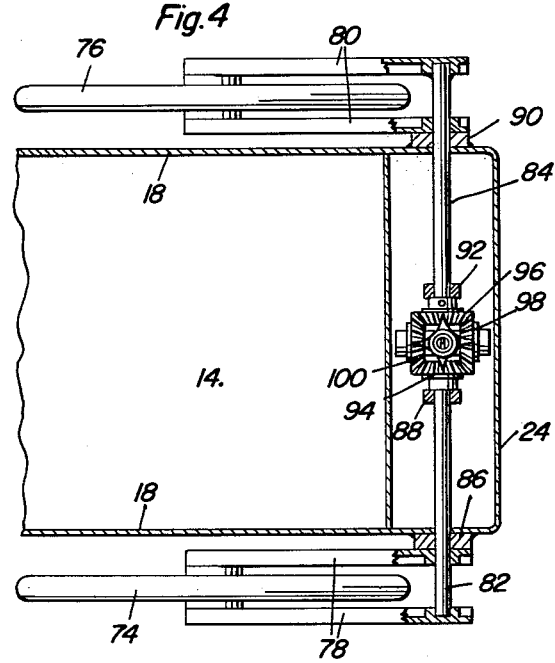
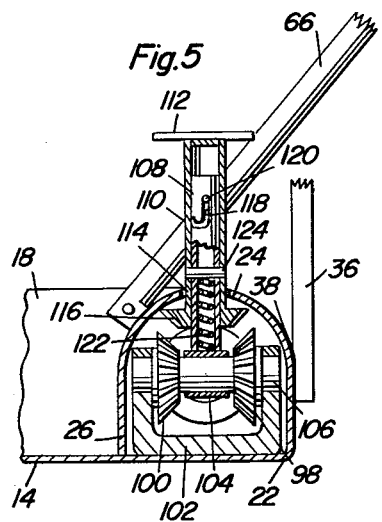
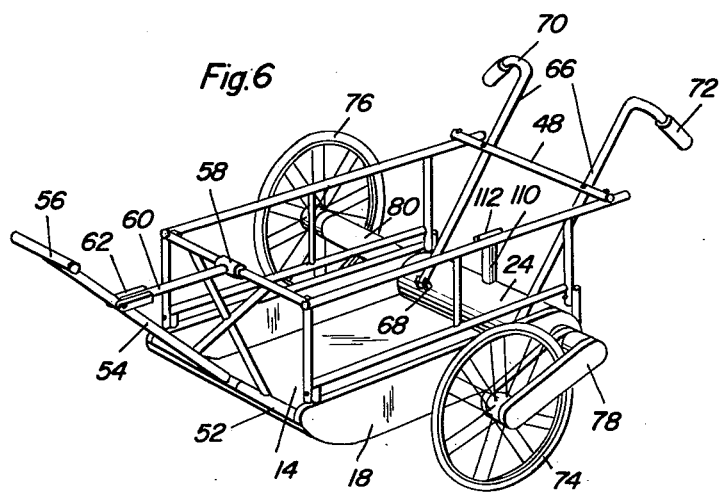
Grant H. Sanstrom
INVENTOR.

Sept. 4, 1962      G. H. SANSTROM      3,052,480
WHEELED CARRIER

Filed Oct. 28, 1959      4 Sheets-Sheet 3

Grant H. Sanstrom
INVENTOR.

Sept. 4, 1962 G. H. SANSTROM 3,052,480
WHEELED CARRIER
Filed Oct. 28, 1959 4 Sheets-Sheet 4
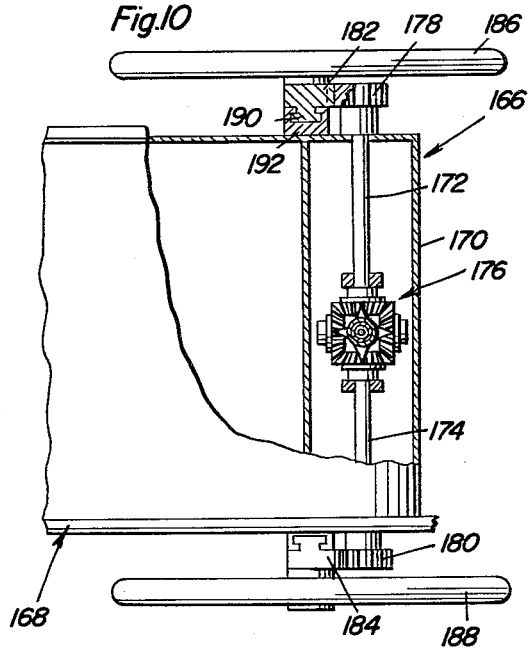
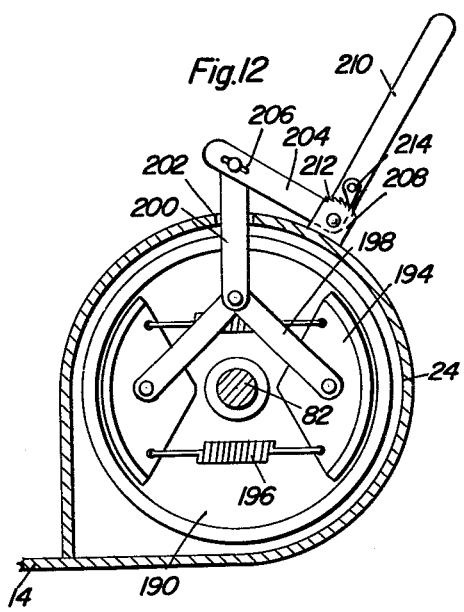
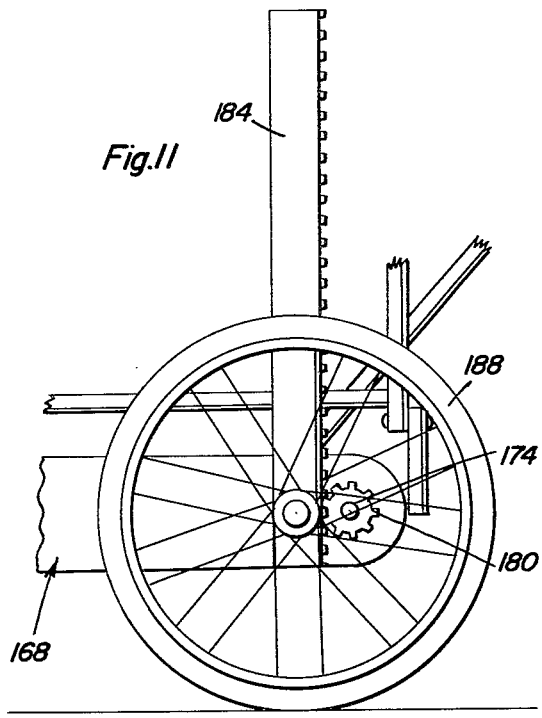
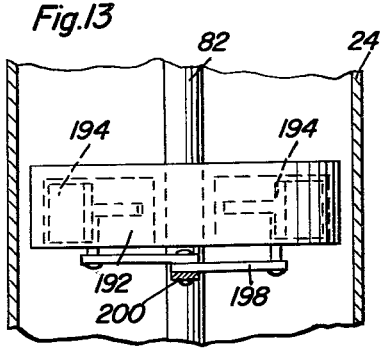
Grant H. Sanstrom
INVENTOR.
BY United States Patent Office 3,052,480
Patented Sept. 4, 1962

1

3,052,480
WHEELED CARRIER
Grant H. Sanstrom, Roosevelt, Wash.
(1612 Gordon Road, Yakima, Wash.)
Filed Oct. 28, 1959, Ser. No. 849,335
7 Claims. (Cl. 280—6)

The present invention generally relates to a vehicle construction generally in the form of a cart or carrier that is wheeled for ease of movement over the ground surface and provided with a novel structural arrangement for supporting the ground engaging wheels from the load carrying body or frame whereby to maintain the load carrying body or frame in level condition even though the terrain being traversed may be uneven thus facilitating the handling of a load over uneven terrain such as that normally encountered by hunters, campers or the like thereby providing a vehicle primarily adapted for use by such individuals for either carrying various camping paraphernalia or for carrying animals such as hunters may have bagged during a hunt.

The primary object of the present invention is to provide a carrier including a body or frame together with ground engaging wheels and a mechanism interconnecting the wheels so that the wheels may engage uneven terrain or inclined surfaces and still maintain the frame or body in substantially horizontal position.

Another object of the present invention is to provide a carrier in accordance with the preceding object in which the position of the wheels may be locked by a lock mechanism.

A further object of the present invention is to provide a carrier which may be manually propelled and guided or powered and which may have only two wheels or have a tricycle arrangement of three wheels and with the body thereof constructed with side members forming sled rails so that the device may be used as a sled when the wheels are removed.

Yet another important feature of the present invention is to provide a carrier in accordance with the preceding objects which is simple in construction, easy to use, long lasting, dependable, adapted for many uses and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the carrier of the present invention;

FIGURE 2 is a top plan view of the construction of FIGURE 1;

FIGURE 3 is a rear elevational view of the carrier;

FIGURE 4 is a transverse sectional view illustrating the interconnecting torsion bar or shaft disposed between the support arms for the ground engaging wheels together with the differential mechanism employed for interconnecting the inner ends of the shafts;

FIGURE 5 is a detailed sectional view illustrating the lock mechanism for locking the wheels in adjusted position;

FIGURE 6 is a perspective view of the present invention illustrating the difference in orientation in the ground engaging wheels while maintaining the load carrying body in a generally horizontal condition;

2

Figure 9:
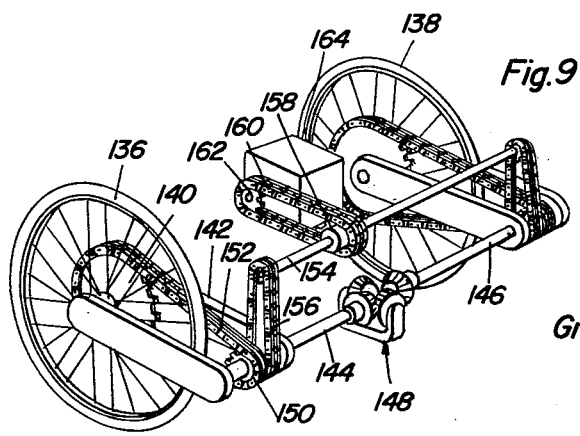

FIGURE 9 is a perspective view of a wheel unit together with a drive mechanism for powering the wheels;

FIGURE 10 is a partial plan view of a modified form of the invention with the major portion thereof broken away illustrating the structural details of the mechanism;

FIGUDE 11 is a side elevational view of the construction of FIGURE 10 illustrating the relationship of the rack and pinion assembly for orientating the wheels in relation to the load carrying body;

FIGURE 12 is a transverse sectional view of the housing interconnecting the wheels and illustrating a brake mechanism for locking the interconnecting shafts in place thereby locking the wheels in adjusted position; and FIGURE 13 is a plan view of the construction of FIGURE 12 and illustrating further details thereof.

Referring now specifically to FIGURES 1-6 of the drawings, the numeral 10 generally designates the carrier of the present invention which includes a load carrying body or frame generally designated by the numeral 12 which includes a bottom 14 having an upturned forward portion 16 and side members or rails 18 in the form of plates having upwardly curved forward edges 20 conforming to the curvature of the upturned forward portion 16. The rear of the bottom 14 is curved upwardly as indicated by the numeral 22 and this portion of the bottom is completely reversely curved and forms a cylindrical housing 24 having an end portion 26 secured to the bottom 14 in spaced relation to the upwardly curved rear edge portion 22.

Attached to each side member 18 adjacent the forward edge thereof is an upstanding post 28 attached to a horizontal rail 30 which extends rearwardly in overlying spaced relation to the upper edge of the side member 18 and has a forward end connected to an upwardly extending post 32 and a rear end connected to an upwardly extending post 34. The post 32 is secured to the post 28 by a suitable fastener and the post 34 is secured to an upstanding post 36 by a suitable fastener with the post 36 being attached to the rear of the cylindrical housing 24 as by welding 38 or the like. The horizontal rail 30 is also provided with an upstanding post 40 intermediate the posts 32 and 34. The posts 32, 40 and 34 are all connected to a horizontal rail 42 at the upper end thereof with the forward ends of the rails 42 being interconnected by a transverse rail 44 secured to lugs 46 on the rails 42 by suitable fasteners. The rear ends of the rails 42 are interconnected by a transverse rail 48 spaced slightly forwardly from the rear ends thereof. The rear portion of each rail 42 is also reinforced by an inclined brace member 50 which extends from the bottom of the post 40 to the top of the post 34. This construction provides a rigid framework mounted atop of the load carrying body 12 and generally forming a continuation thereof for retaining a load in position on the body. All of the fastener elements are removable so that the various frame members may be removed and placed in the load carrying body if desired.

The forward upper corners of the side members 18 are interconnected by a transverse rail 52 having an elongated upwardly extending handle member 54 journaled thereon with the handle member 54 terminating in a transverse hand grip 56 at the upper end thereof. Mounted on the transverse rail 44 is a sleeve 58 having a forwardly extending rod 60 connected thereto. The rod 60 is provided with a yoke 62 at the outer end thereof which is detachably connected to the handle member 54 by a suitable fastener arrangement. Also, the handle member 54 is provided with a hand strap 64 adjacent the transverse hand grip 56 for facilitating the towing of the vehicle.

To facilitate control of the vehicle, the cylindrical housing 24 is provided with a pair of rearwardly and upwardly inclined handle members 66 each being secured to the transverse rail 48 by suitable fasteners and also secured to the cylindrical housing 24 by pivot lugs 68 and suitable fasteners. The upper and rearward ends of the handle members 66 extend outwardly and rearwardly in an inclined manner as indicated by the numeral 70 and each of the outwardly and rearwardly inclined portions 70 is provided with a hand grip 72 thereon. The hand grips approximate the position of a pair of handle bars whereby a person trailing the vehicle may grasp the hand grips 72 which also are inclined downwardly and thus provide adequate control for maneuvering of the carrier.

Mounted on opposite sides of the body is a pair of ground engaging spoked wheels which are designated by the numerals 74 and 76. The wheels 74 and 76 may be of any suitable form such as bicycle wheels or the like depending upon the size of the carrier and depending upon the loads it is intended to carry. Rotatably supporting the wheel 74 is a pair of arms 78 and rotatably supporting the wheel 76 is a pair of arms 80. The pair of arms 78 are rigidly affixed to a shaft 82 while the arms 80 are rigidly affixed to a shaft 84. The shaft 82 extends into the cylindrical housing 24 and is journaled in a bearing 86 at the outer end of the housing 24 and a support bearing 88 adjacent the inner end of the shaft 82. The shaft 84 also is supported by similar bearings 90 and 92.

The shaft 82 is provided with a bevel gear 94 on the inner end thereof and the shaft 84 is provided with a bevel gear 96 on the inner end thereof with the bevel gears 94 and 96 being disposed in facing relation and in meshed engagement with a pair of idler gears 98 and 100 which are journaled on a suitable carrier or cage 102 supported rigidly from the housing 24 thereby to prevent rotation of the carrier or cage 102 but still permitting idling of the idler gears 98 and 100. Since the idler gears 98 and 100 cannot revolve about the axis of the shafts 84 and 82, any rotation of either of the shafts will cause a corresponding reverse rotation of the other of the shafts. For example, if the shaft 82 rotates in one direction, the differential assembly will cause rotation of the shaft 84 in the other rotational direction for an equal degree of rotation. Thus, if one of the wheels such as the wheel 76 in FIGURE 6 engages an obstruction or an elevated area, this wheel 76 will ride up the elevational change and due to the rotation of the shaft 84 when the wheel 76 moves upwardly in relation to the body 12, the shaft 82 will be rotated an equal amount in the other direction thereby swinging the arms 78 and the wheel 74 downwardly to the position illustrated in FIGURE 6 thus permitting the wheels to vary in accordance with the elevational changes of the terrain being traversed while maintaining the load carrying body 12 in substantially transverse level condition.

FIGURE 5 illustrates a mechanism for locking the differential assembly and this includes a tubular sleeve 104 journaled on the shaft 106 which supports the idler gears 98 and 100 and extending upwardly from the sleeve 104 is a tubular member 108 which telescopically receives an outer tubular member 110 having a transverse handle 112 at the upper end thereof. The tubular members 108 and 110 extend upwardly through an opening 114 in the cylindrical housing 24 and the lower end of the outer cylindrical member 110 carries a four pointed member 116 which will engage or mesh with all of the gears 94, 96, 98 and 100 thereby preventing rotation of any of the gears and locking the shafts 82 and 84 together whereby the shafts will then act solely as a torsion bar interconnecting the supporting arms 78 and 80.

A lock mechanism is provided for retaining the four pointed member 116 in engagement with the gears and this includes a pair of substantially L-shaped slots 118 in the inner tubular member 108 for receiving a transverse pin 120 carried by the outer cylindrical member 110. When the outer tubular member 110 is moved down and the pin 120 is moved into engagement with the horizontal portion of the slots 118, then the pointed member 116 is locked into engagement with the gears thus forming a lock for the differential. A compression coil spring 122 is provided within the inner tubular member 108 and is engaged with a transverse pin 124 carried by the outer tubular member 110 which pin rides in a slot in the inner tubular member 108 thereby resiliently urging the outer tubular member and the locking member 116 carried thereby to a retracted position thereby normally urging the locking member out of engagement with the differential assembly.

With this structure, the wheels may be locked in any desired relative position by employing the locking member 116. Normally, the wheels will be unlocked to permit relative elevational changes between the wheels and upward movement of one wheel causes corresponding and equal downward movement of the other wheel whereby relative elevational changes between the wheels will not effect the lateral levelness of the load carrying body thereby providing a highly stable load carrying body which will enable various types of loads to be more effectively carried and handled. It is pointed out that the body will not tip to one side while it is setting still since elevational changes between the wheels actually shorten or lengthen the distance therebetween thus requiring lateral sliding movement of the wheels when moving in elevational relationship to each other which is easily accomplished during rolling movement of the wheels but quite difficult to accomplish when standing still.

Figure 7:
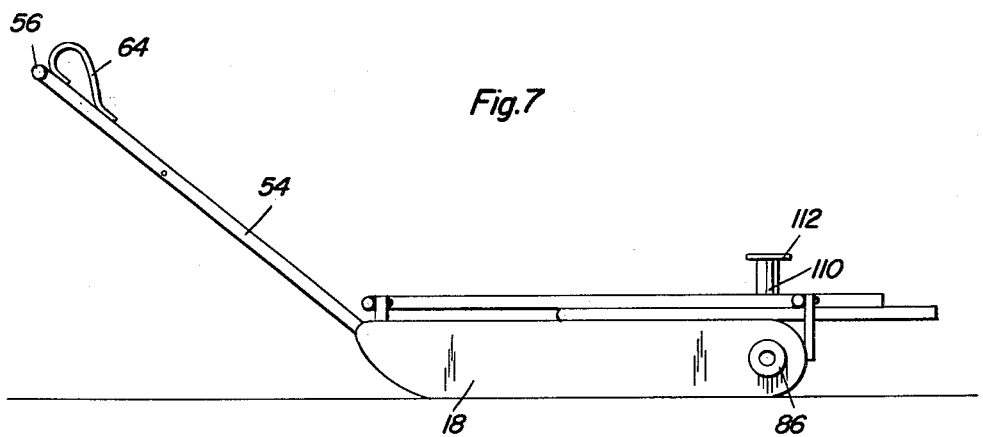
FIGURE 7 is a side elevation of the present invention with the wheels and rear handle bars removed with the device acting as a sled or toboggan.

When it is desired to use the device as a sled, the wheels, handle bars and frame superstructure are all removed thereby enabling the bottom and side members 14 and 18 as well as the front member 16 to engage the surface and act as a sled as illustrated in FIGURE 7.

Figure 8:
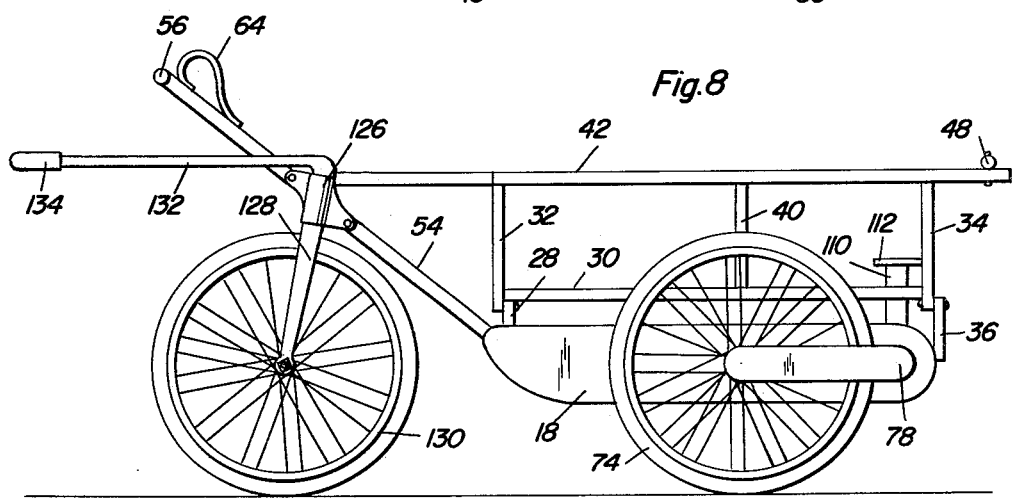
FIGURE 8 is a side elevational view of the present invention with a forwardly mounted single wheel for converting the carrier to a tricycle type carrier.

In FIGURE 8, there is illustrated an arrangement whereby the device is converted to a tricycle type of carrier in which a bracket 126 is attached to the handle member 54 and the bracket 126 journals a yoke 128 which journals a front wheel 130 therein. The upper end of the yoke 128 extends forwardly and forms an elongated handle member 132 having a hand grip on the front end thereof designated by the numeral 134 whereby the elongated member 132 acts somewhat as a tiller for pivoting the front wheel 130. The bracket 126 has considerable offset in relation to the handle 54 thereby enabling sufficient movement to steer and control the direction of travel of the vehicle. In this form of the invention, the handle members 66 may or may not be employed depending upon the load being carried and the terrain encountered.

FIGURE 9 illustrates a modified supporting wheel assembly which is powered and in this form of the invention, the support wheels 136 and 138 are each provided with drive sprockets 140 attached to the spokes on the inner surface thereof and between the support arms 142. The support arms 142 are rigidly affixed to the shafts 144 and 146 respectively which are connected with a differential assembly generally designated by the numeral 148 and which is identical to the differential assembly illustrated in FIGURES 4 and 5. In this form of the invention, each of the shafts 144 and 146 is provided with a sprocket assembly 150 journaled between the arms 142 respectively. The sprocket assembly 150 is journaled on the shafts 144 and 146 and includes one sprocket in alignment with the sprocket gear 140 for receiving a drive chain 152. The other sprocket of the sprocket assembly 150 is in alignment with a drive sprocket on a drive shaft 154 which is encircled by a chain 156 for transmitting power to the wheels 136 and 138. The shaft 154 is in the form of a lay shaft and is provided with a sprocket 158 receiving a drive chain 160 driven from an output sprocket gear 162 driven from a power source 164 such as an internal combustion engine, electric motor driven by batteries or any other suitable means for propelling the wheels 136 and 138 thereby providing a propulsion vehicle. In this form of the invention, any suitable controls may be provided for controlling the rotational speed and other characteristics of the drive mechanism. The differential assembly 148 operates in the same manner as in the manually propelled type of vehicle.

In FIGURES 10 and 11, there is illustrated another modified form of the invention designated generally by the numeral 166 which includes a load carrying body generally designated by the numeral 168 including a rear cylindrical housing 170. The housing 170 journals a pair of shafts 172 and 174 which are interconnected by a differential assembly generally designated by the numeral 176 which is equivalent and similar to the differential assembly shown in the previous forms of the invention and in which the shafts 172 and 174 may be rigidly locked to each other or allowed to rotate freely whereby rotation of one shaft will cause rotation of the other shaft in an opposite direction for an equal degree of rotation. The shaft 172 is provided with a gear 178 on the outer end thereof while the shaft 174 is provided with a gear 180 on the outer end thereof.

The gear 178 is in meshing engagement with an elongated rack gear 182 while the gear 180 is in mesh with an elongated rack gear 184. The rack gear 182 carries a supporting wheel 186 journaled on the bottom end thereof while the rack gear 184 carries a supporting wheel 188 journaled on the lower end thereof whereby rotation of the gears 180 and 178 will cause corresponding vertical movement of the rack gears and the corresponding wheels. The rack gear 182 and the rack gear 184 are each provided with a longitudinal T-shaped projection 190 on the inner surface thereof which is slidingly received in a correspondingly shaped guide member 192 secured to the load carrying body 168. Thus, the movement of the rack gears 182 and 184 will be guided in a vertical manner so that they will move in parallel relation and so that they will remain in meshed engagement with the gears 178 and 180 respectively.

In this form of the invention, if one of the wheels encounters an elevated area, the wheel will move upwardly by virtue of the guide 182 and this will cause rotation of the shaft 172 in one direction. As the rotational movement is transmitted through the differential assembly 176, the shaft 174 and gear 180 will be rotated in such a manner that the other wheel such as wheel 188 will be moved downwardly a corresponding amount thus maintaining the load carrying body 168 in level condition.

FIGURES 12 and 13 illustrate another manner of locking either or both of the shafts 82 or 84. If either of the shafts is locked, then the differential assembly is locked and the shafts become as if they were a single shaft. For example, the shaft 82 is provided with a plate 190 rigidly affixed thereto and the plate 190 is provided with a cylindrical flange 192 on the periphery thereof which forms a brake drum. Mounted within the confines of the brake drum and interiorly of the cylindrical flange 192 is a pair of brake shoe elements 194 which may have friction producing material on the external surface thereof. A pair of tension springs 196 interconnect the brake shoe elements 194 and normally urge them away from the internal surface of the cylindrical flange 192. Each of the brake shoe elements 195 is provided with a link 198 pivotally connected thereto and which links extend upwardly in converging relation and are pivotally attached to each other and pivotally attached to an upwardly extending arm 200 which extends outwardly through an opening 202 in a cylindrical housing such as the cylindrical housing 24. The upper end of the arm 200 is connected to the outer end of one arm of a bell crank 204 by a pin and slot connection with the slot 206 affording relative movement at the point of juncture between the member 200 and the arm 204 since these elements pivot about different centers.

A pair of supporting lugs 208 pivotally support the bell crank and the other arm 210 of the bell crank forms a handle for operating the bell crank. The supporting lugs 208 are provided with serrations or ratchet teeth 212 for engagement by a manually operated pawl or dog 214 so that when the handle 210 is operated to spread the brake shoes 194 apart, the ratchet 214 will maintain the brake shoes 194 in locked engagement with the interior surface of the cylindrical flange 192. When the bell crank is moved in the other direction after the release of the dog 214, the arm 200 moves upwardly thus collapsing the brake shoe elements 194 away from the flange 192.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A carrier comprising a pair of ground engaging support devices, a stub shaft connected to each of said devices, said devices being movable up and down in separate vertical planes, a load carrying frame carried by said shafts, a handle bar member extending forwardly from the frame, a handle bar member extending rearwardly from said frame and means interconnecting said shafts for moving one of the devices downwardly when the other of the devices moves upwardly thereby maintaining the load carrying frame in substantially horizontal position, each of said devices including a ground engaging wheel, said wheels being disposed forwardly of the shafts and means interconnecting the wheels and the shafts for causing rotation of the shafts when the position of the wheels change, each said means interconnecting a wheel and a shaft including an elongated vertically disposed rack gear, said wheel being journaled on the rack gear, means slidably mounting the rack gear on the load carrying frame for vertical reciprocating movement, each of said shafts having a pinion gear thereon in meshing engagement with the rack gear for rotating the shafts in response to elevational changes of the wheels in relation to the frame, said means slidably mounting the rack gear including a vertically extending T-shaped joint.

2. A carrier comprising a pair of ground engaging support devices, a stub shaft connected to each of said devices, said devices being movable up and down in separate vertical planes, a load carrying frame carried by said shafts, a handle bar member extending forwardly from the frame, a handle bar member extending rearwardly from said frame and means interconnecting said shafts for moving one of the devices downwardly when the other of the devices moves upwardly thereby maintaining the load carrying frame in substantially horizontal position, each of said devices including a ground engaging wheel, said wheels being disposed forwardly of the shafts and means interconnecting the wheels and the shafts for causing rotation of the shafts when the position of the wheels change, said means interconnecting the shafts including a differential gear assembly including a freely rotatable idler bevel gear, and a bevel gear on the inner end of each shaft meshing with the rotatable gear thereby assuring opposite and equal rotational movement of the shafts, said wheels and interconnecting means being removable, said frame including a flat floor, one end of said floor being curved upwardly and looped back upon itself to form a housing for the interconnecting means.

3. A carrier comprising a pair of ground engaging support devices, a stub shaft connected to each of said devices, said devices being movable up and down in separate vertical planes, a load carrying frame carried by said shafts, a handle bar member extending forwardly from the frame, a handle bar member extending rearwardly from said frame and means interconnecting said shafts for moving one of the devices downwardly when the other of the devices moves upwardly thereby maintaining the load carrying frame in substantially horizontal position, each of said devices including a ground engaging wheel, said wheels being disposed forwardly of the shafts and means interconnecting the wheels and the shafts for causing rotation of the shafts when the position of the wheels change, the means interconnecting said shafts including a plurality of gears, means supported from the frame for locking said shafts from rotation thereby retaining the supporting wheels in desired position, said locking means including a positive brake interconnecting the frame and one of said shafts for locking one of said shafts thereby preventing rotation of the shafts, said brake including a member movably connected to said frame, said member having a plurality of points engageable simultaneously with all of said gears.

4. A carrier comprising a pair of ground engaging support devices, a stub shaft connected to each of said devices, said devices being movable up and down in separate vertical planes, a load carrying frame carried by said shafts, a handle bar member extending forwardly from the frame, a handle bar member extending rearwardly from said frame and means interconnecting said shafts for moving one of the devices downwardly when the other of the devices moves upwardly thereby maintaining the load carrying frame in substantially horizontal position, each of said devices including a ground engaging wheel, said wheels being disposed forwardly of the shafts and means interconnecting the wheels and the shafts for causing rotation of the shafts when the position of the wheels change, said frame being provided with a load carrying body having side rails and a bottom, the bottom and side rails forming runners for supporting the device for use as a sled, one end of said bottom curved upwardly and over the means interconnecting the wheel and the shafts.

5. The combination of claim 4 together with an attachable wheel pivotally connected to the forward central portion of the vehicle for pivotal movement about a vertical axis thereby facilitating movement of the vehicle over rough terrain.

6. A hand controlled load carrying vehicle comprising a frame, a load carrying body supported from the frame, said frame including forwardly extending handle bar control means, said frame including rearwardly and upwardly extending handle bar control means, said frame including a hollow transverse housing at the rear thereof, a pair of shafts disposed in the housing with the outer ends extending outwardly of the housing, said shafts being in axial alignment, means interconnecting the inner ends of the shafts whereby rotation of one shaft in one direction will cause rotation of the other shaft in the other direction, and means locking said shafts to prevent rotation in either direction for retaining the shafts in a desired position, said last named means normally being disengaged for free rotational movement of the shafts whereby a force exerted on one shaft will cause rotation thereof and will cause rotation of the other shaft in the other rotational direction, each of the shafts having a forwardly extending arm rigid with the outer end thereof, said arm journalling a ground engaging wheel on the free end thereof whereby upward movement of one wheel will cause downward movement of the other wheel thereby maintaining the frame and load carrying body in level condition regardless of the terrain over which the wheels pass, said means interconnecting the inner ends of said shaft including a bevel gear on the inner end of each shaft, a freely rotatable idler gear meshing with the bevel gears, and means movably mounted on the frame for engagement with one of said gears for preventing rotation thereof thereby preventing rotation of both of the shafts, said last named means including a first tube extending normal to the axis of the idler gear, one end of the tube journalled on said axis, a spring in said tube, a second tube slidable on the first tube, teeth on said second tube selectively engageable with one of said gears, means connecting said spring with said second tube whereby said spring normally urges said teeth away from said one gear.

7. A device as defined in claim 6 wherein manually operative lock means are provided between said tubes for selectively maintaining said teeth in engagement with said one gear.

References Cited in the file of this patent

UNITED STATES PATENTS

| | | |
|---|---|---|
| 546,730 | Daniels | Sept. 24, 1895 |
| 764,357 | Heaslet | July 5, 1904 |
| 2,208,600 | Ronning | July 23, 1940 |
| 2,458,400 | Milliken | Jan. 4, 1949 |
| 2,564,202 | Hanson | Aug. 14, 1951 |
| 2,565,848 | Howard | Aug. 28, 1951 |
| 2,584,122 | Gilmore | Feb. 5, 1952 |

FOREIGN PATENTS

| | | |
|---|---|---|
| 128,292 | Austria | May 25, 1932 |
| 332,933 | Great Britain | July 28, 1930 |
| 450,518 | Italy | July 23, 1949 |
| 82,672 | Norway | Oct. 26, 1953 |
| 310,922 | Switzerland | Jan. 14, 1956 |